United States Patent [19]

Adachi et al.

[11] Patent Number: 5,415,968

[45] Date of Patent: May 16, 1995

[54] SURFACE PROTECTIVE FILM OF COLOR FILTER

[75] Inventors: Hiroshi Adachi; Yamamoto Shigeyuki, both of Amagasaki, Japan

[73] Assignee: Mitsubishi Denki Kabushiki Kaisha, Tokyo, Japan

[21] Appl. No.: 794,060

[22] Filed: Nov. 19, 1991

[30] Foreign Application Priority Data

Nov. 19, 1990 [JP] Japan ................. 2-315179

[51] Int. Cl.$^6$ ............................. G03F 7/012
[52] U.S. Cl. ................... 430/197; 430/167; 430/286; 430/287
[58] Field of Search ............... 430/197, 167, 286, 287

[56] References Cited

U.S. PATENT DOCUMENTS

| | | | |
|---|---|---|---|
| 4,507,384 | 3/1985 | Morita et al. | 430/287 |
| 4,564,576 | 1/1986 | Saigo et al. | 430/197 |
| 4,657,843 | 4/1987 | Fukuyama et al. | 430/286 |
| 4,702,990 | 10/1987 | Tanaka et al. | 430/197 |
| 4,722,881 | 2/1988 | Ueno et al. | 430/192 |
| 4,822,716 | 4/1989 | Onishi et al. | 430/197 |
| 4,939,065 | 7/1990 | Cavezzan et al. | 430/167 |
| 5,059,512 | 10/1991 | Babich et al. | 430/286 |
| 5,087,553 | 2/1992 | Adachi et al. | 430/330 |
| 5,158,854 | 10/1992 | Imamura et al. | 430/197 |

FOREIGN PATENT DOCUMENTS 61-3120 1/1986 Japan .
61-3124 1/1986 Japan .
6-254905 11/1986 Japan .

OTHER PUBLICATIONS

*Electronic Material*, pp. 53–60, Dec. 1988.

*Primary Examiner*—Charles L. Bowers, Jr.
*Assistant Examiner*—John S. Chu
*Attorney, Agent, or Firm*—Birch, Stewart, Kolasch & Birch

[57] ABSTRACT

A solution containing a low-temperature curing type organosilicon ladder resin composition comprising: (A) a polylphenysylsesquioxane which has a hydroxyl group at the end, in which 3% of the side chain consists of vinyl groups, and which has a weight-average molecular weight of 150,000; (B) 1.8 wt % of 3,3'-diazidophenylsulfone based on the polylphenysylsesquioxane (A); and (C) methoxybenzene which is added to the polylphenysylsesquioxane (A) so that the polylphenysylsesquioxane content is about 15 wt % is used as the material for a surface protective film of a color filter for a light-receiving element or a display element.

13 Claims, No Drawings

SURFACE PROTECTIVE FILM OF COLOR FILTER

BACKGROUND OF THE INVENTION

1. Field of the Invention

The present invention relates to a surface protective film of a color filter for light-receiving elements and display elements.

2. Description of the Related Art

As surface protective films for color filters for light-receiving elements and display elements, surface protective films of, for example, acrylic polymer (*Electronic Material*, pp. 53 to 60, Dec., 1988), polyimide (Japanese Patent Laid-Open No. Sho 61-254905), and organosilicon ladder polymer having a cage or hydroxyl group type end (Japanese Patent Laid-Open Nos. Sho 61-3120 and Sho 61-3124) are conventionally known.

In manufacturing a color filter for a display element, after a surface protective film of the color filter is formed, a transparent electrode is formed on the surface protective film at a temperature of not lower than 250° C., thereby producing a display element. In manufacturing a color filter for a light-receiving element the light-receiving element is sealed by a resin at 250° C. in the final process of production. When either these elements are mounted on a substrate, they are soldered at a temperature of not lower than 250° C.

In order to protect the color filter, it is therefore necessary that the surface protective film formed on the color filter not only has a high light transmittance but also a heat resistance high enough to withstand the above-described heat treatment.

Among the above-described materials for surface protective films are the acrylic polymers which while they have a high light transmittance also have a poor heat resistance, so that the light transmittance sometimes deteriorates by the above-described heat treatment.

Polyimides have an excellent heat resistance but since the inorganic ingredient, which is generated during thermal cure, adheres to the wafer surface and obstructs the subsequent steps, an oxygen plasma treatment is required in order to prevent this phenomenon. The process for producing a protective film thus becomes complicated, and the film formed is inferior in light transmittance. In addition, since the varnish used is a polar solvent, it has a poor moisture resistance making it necessary to keep the varnish in a cool and dark place.

Among the organosilicon ladder polymers disclosed in Japanese Patent Laid-Open Nos. Sho 61-3120 and Sho 61-3124, organosilicon ladder polymers having a cage type end are inferior in adhesiveness with a substrate, so that they sometimes become separated from the color filter. In addition, since they are not cured by heating, they sometimes dissolve in the solvent which is used in the resist removing process after pattern formation. That is, they have a poor solvent resistance. Organosilicon ladder polymers having a hydroxyl group at the end are cured when heated at 150° to 350° C. while DBU (1,8-diazabicyclo-[5,4,0]-7-undecene) is used as a curing catalyst, but the curing catalyst deteriorates the light transmittance of the surface protective film and has a harmful effect on the characteristics of the color filter. In addition, since the organosilicon ladder polymers having a hydroxyl group at the end have a low molecular weight ($5 \times 10^4$), they have inferior film-forming properties, so that when the film is subjected to various treatments after film formation, a crack is apt to be produced in the protective film making it impossible to form a thick film.

SUMMARY OF THE INVENTION

Accordingly, it is an object of the present invention to eliminate the above-described problems in the related art and to provide a surface protective film for a color filter which is excellent in heat resistance, light transmittance and adhesiveness with a substrate.

As a result of studies undertaken by the present inventors, it has been found that an organosilicon ladder resin composition, which is cured at a low temperature so as to keep the excellent characteristics which are exhibited by polyphenylsylsesquioxane, such as light transmittance and heat resistance, is obtained by adding a small amount of alkenyl group such as a vinyl group and an allyl group to an organosilicon ladder polymer and adding a trace amount of aromatic diazido compound thereto as a catalyst, and then forming a pattern on the thus-obtained resin composition by an organic solvent while using a resist as a mask. The present invention has been achieved on the basis of this finding.

The present invention is characterized in that a solution containing a low-temperature curing type organosilicon ladder resin composition comprising the following constituents (A) and (B) is used as the material of a surface protective film for a color filter for a light-receiving element or a display element:

(A) a low-temperature curing type organosilicon ladder polymer having a hydroxyl group at the end which is represented by the following general formula (I):

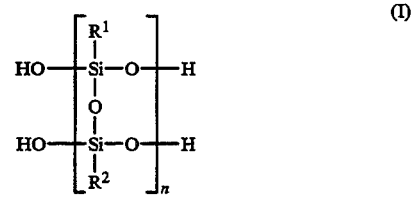

wherein $R^1$ and $R^2$ each represent phenyl group, methyl group or alkenyl group, provided that 2.5 to 10% of n $R^1$ and $R^2$ are alkenyl groups, n representing an integer under the condition that the weight-average molecular weight of the organosilicon ladder is 75,000 to 250,000, (B) 0.25 to 2.5 wt % of an aromatic bisazide compound based on the low-temperature curing type organosilicon ladder polymer (A).

The present invention is also characterized in that a surface protective film of a color filter is formed by coating the surface for the color filter with the solution containing the low-temperature curing type organosilicon ladder resin composition, applying a positive resist to the coated surface, forming a pattern on the coating by lithography and thermosetting the coating at a temperature of not higher than 270° C.

The ratio of the alkenyl groups to $R^1$ and $R^2$ in the general formula (I) which represents the organosilicon ladder polymer is 2.5 to 10%, preferably 3 to 8%. If it is less than 2.5%, the curability becomes so inferior that it becomes necessary for the polymer to be thermoset at not lower than 300° C. On the other hand, if the ratio exceeds 10%, although the curing temperature is lowered to 150° C., the heat resistance of the organosilicon ladder polymer film after thermal cure is lowered. As an alkenyl group, a vinyl group and an alkenyl group are preferable because an organosilicon ladder polymer having a short side chain is superior in heat resistance after thermal cure.

The symbol n in the general formula (I) is an integer under the condition that the weight-average molecular weight is 75,000 to 250,000, preferably 100,000 to 200,000. The weight-average molecular weight is set in the above-described range because a weight-average molecular weight of not less than 75,000 is preferable in order to form a film of 1 to 10 $\mu$m thick. Too high a molecular weight (especially, a molecular weight of more than 250,000) takes a long etching time in order to form the desired pattern and deteriorates the accuracy of the pattern.

In the present invention, an organosilicon ladder polymer having a hydroxyl group at the end is used in order to enhance the adhesiveness with a substrate.

Examples of such an organosilicon ladder polymer are polyphenylvinylsylsesquioxane, polyallylphenylsylsesquioxane, polymethylvinylsylsesquioxane, polyallylmethylsylsesquioxane, polyethylvinylsylsesquioxane, and polyallylethylsylsesquioxane.

The organosilicon ladder polymer is obtained by dissolving a trichlorosilane compound in an organic solvent and hydrolyzing the solution to produce a prepolymer, adding a polymerization catalyst to the organic layer containing the prepolymer and heating the organic layer.

As the curing catalyst which is to be mixed with the organosilicon ladder polymer, an aromatic diazido compound is used because the ultraviolet absorption of the curing catalyst must not be in the characteristic range of the color filter. Among the aromatic bisazide compounds, 3,3'-diazidodiphenylsulfone, 4,4-diazidodiphenylsulfone, etc. are favorable.

The mixing ratio of the aromatic bisazide compound is 0.25 to 2.5 wt %, preferably 0.3 to 2 wt % based on the organosilicon ladder polymer. If it is less than 0.25%, the effect of the aromatic diazido compound as a catalyst is so small as to require the polymer to be heated at a temperature of higher than 270° C. On the other hand, if the mixing ratio exceeds 2.5 wt %, the polymer is apt to have harmful effect on the spectral characteristics of the color filter.

As the solvent of the resin composition, one can use aromatic hydrocarbons such as anisole, xylene and benzene; ketone solvents such as methylisobutyl ketone and acetone; ether solvents such as tetrahydrofuran and isopropyl ether; ethyl cellosolve; N-methyl-2-pyrrolidone; and N,N'-dimethylacetamide.

The surface protective film of the present invention is a transparent resin film obtained by coating the color filter with the resin composition, applying a positive resist on the coating, forming a pattern on the coating by lithography and thermosetting the coating at a temperature of not higher than 270° C.

As one of the methods of forming the resin composition film, the resin composition is applied to the color filter by rotary coating or the like, and the resin composition is dried at a temperature which is close to the boiling point of the solvent for about 30 minutes until the solvent is evaporated. The thickness of the film obtained is preferably 1 to 10 $\mu$m.

The positive resist is applied to the resin composition film while it is not cured. The thickness of the resist film is ordinarily about 2 to 4.5 $\mu$m. When the surface protective film is thick, the thickness of the resist film is increased so as to prevent the resist film from being damaged during the wet etching of the surface protective film and to form a pattern on the surface protective film with high accuracy.

In the lithography step, a desired resist pattern is formed by exposure after masking the film, and the surface protective film is then etched to form the desired pattern by using an organic mixed solvent of methoxy benzene, xylene, etc. while using the resist in turn as a mask.

The surface protective film is next thermoset at a temperature of not higher than 270° C. If the heating temperature exceeds 270° C., the characteristics of the color filter are lost. The curing time is preferably not more than 45 minutes.

In this way, it is possible to form a transparent surface protective film of about 1 to 10 $\mu$m without losing the characteristics of the color film. The transparency in the present invention means a light transmittance of not less than 90% at a wavelength of 300 nm.

The surface protective film of the present invention obtained in this way is excellent in adhesiveness with a substrate, heat resistance, light transmittance and solvent resistance.

The above and other objects, features and advantages of the present invention will become clear from the following description of the preferred embodiments thereof.

DESCRIPTION OF THE PREFERRED EMBODIMENTS

The present invention will be explained in more detail with reference to the following examples, but it is to be understood that the present invention is not restricted thereto.

EXAMPLE 1

Polyphenylsylsesquioxane which has a hydroxyl group at the end, in which 3% of the side chain consists of vinyl groups and which has a weight-average molecular weight of 150,000 was prepared. To the polymer was added 1.8 wt % of 3,3'-diazidodiphenylsulfone based on the polymer and methoxybenzene was added to prepare a solution of a resin composition (polymer concentration: 15 wt %). The solution of the resin composition was applied to a color filter to a thickness of 4 $\mu$m, dried at 80° C. for 30 minutes and then at 150° C. for 30 minutes. Thereafter, a positive resist was applied to the color filter so as to form a resist film of 3 $\mu$m thick, and a predetermined pattern was formed by exposure. The transparent resin layer was etched by a mixed solution of methoxy benzene/xylene ($\frac{1}{3}$ by volume ratio) while using the resist as a mask. After the resist was removed by an ordinary resist remover, the color filter was cured by being heated at 260° C. for 30 minutes.

The surface protective film obtained had a thickness of 4 $\mu$m, and it had excellent heat resistance, transparency and adhesiveness with the substrate. No cracking was produced on the color filter.

When a transparent electrode was formed on the surface protective film and after a predetermined process of forming a pattern by using an acid as an etchant, the transparent electrode was not separated and no cracking was produced on the surface protective film. Even after the solution of the resin composition was kept at 40° C. for 1,000 hours, there was no change in viscosity, and an excellent surface protective film was formed on the color filter as at the initial time.

EXAMPLES 2 TO 7

Solutions of a resin composition were prepared, patterns were formed, the color filters were thermoset and transparent electrodes were formed on the surface protective film in the same way as in Example 1 except that the corresponding polyphenylsylsesquioxanes and the curing catalysts shown in Table 1 were used. In all of Examples, there were no problems, as shown in Table 1. Even after each solution of the resin composition was kept at 40° C. for 1,000 hours, there was no change in viscosity, and an excellent surface protective film was formed on the color filter as at the initial time.

COMPARATIVE EXAMPLE 1

A polyphenylsylsesquioxane having a cage type end and having a weight-average molecular weight of 100,000 was dissolved in benzene. The benzene solution was applied to a color filter to form a protective film, and a resist film was formed thereon. After a desired pattern was formed on the resist and the protective film, the color filter was immersed in a remover so as to remove the resist. Since the polyphenylsylsesquioxane had a cage type end, the adhesiveness with the color filter was poor and a part of the protective film was separated.

COMPARATIVE EXAMPLES 2 TO 5

Solutions of a resin composition were prepared, patterns were formed, the color filters were thermoset and transparent electrodes were formed on the surface protective film in the same way as in Example 1 except that the corresponding polyphenylsylsesquioxanes and the curing catalysts shown in Table 1 were used.

In Comparative Example 2, since there was no catalyst, it was necessary to heat the protective film at 350° C. for curing. After this process, the color filter was faded and deteriorated.

In Comparative Example 3, although the protective film was cured at 200° C., since the content of the vinyl groups was large, the heat resistance was lowered and the surface protective film was deteriorated after the formation of the transparent electrode.

In Comparative Example 4, since the allyl group content was 10% and the catalyst content was as low as 2 wt %, the effect of the catalyst was not obtained and it was necessary to heat the protective film at 300° C. for curing. After this process, the color filter was faded.

In Comparative Example 5, since the allyl group content was as low as 2%, it was necessary to heat the protective film at 280° C. for curing although the catalyst content was as large as 3 wt %. After this process, the color filter was faded and deteriorated.

TABLE 1

| | Silicone ladder polymer | Catalyst (wt % *1) | Surface protective film after formation of pattern | Curing conditions Temp. (°C.) | Time (min.) | Color filter after formation of surface protective film | Surface protective film after formation of transparent electrode |
|---|---|---|---|---|---|---|---|
| Ex. | | | | | | | |
| 1 | A (Mw: 150,000, vinyl group content: 3%) | D (1.8) | F | 200 | 30 | H | F, H |
| 2 | A (Mw: 180,000, vinyl group content: 8%) | E (0.3) | F | 260 | 30 | H | F, H |
| 3 | A (Mw: 150,000, vinyl group content: 5%) | D (1.0) | F | 220 | 30 | H | F, H |
| 4 | A (Mw: 150,000, allyl group content: 4%) | E (2.0) | F | 210 | 30 | H | F, H |
| 5 | A (Mw: 150,000, allyl group content: 9%) | D (0.25) | F | 240 | 30 | H | F, H |
| 6 | B (Mw: 150,000, allyl group content: 5%) | E (0.8) | F | 220 | 30 | H | F, H |
| 7 | B (Mw: 150,000, vinyl group content: 9%) | D (1.5) | F | 190 | 30 | H | F, H |
| Comp. | | | | | | | |
| 1 | C (Mw: 100,000, | None | G | — | — | — | — |
| 2 | A (Mw: 100,000, Allyl group content: 8%) | None | F | 350 | 60 | I | — |
| 3 | A (Mw: 150,000, vinyl group content: 15%) | D (0.5) | F | 200 | 30 | H | J |
| 4 | B (Mw: 150,000, allyl group content: 10%) | D (2.0) | F | 300 | 30 | I | — |
| 5 | B (Mw: 150,000, allyl group content: | E (3.0) | F | 280 | 30 | I | — |

TABLE 1-continued

| Silicone ladder polymer | Catalyst (wt % *1) | Surface protective film after formation of pattern | Curing conditions Temp. (°C.) | Time (min.) | Color filter after formation of surface protective film | Surface protective film after formation of transparent electrode |
|---|---|---|---|---|---|---| content: 2%)

*1: ratio of catalyst to silicon ladder polymer
A: Phenyl ladder polymer having hydroxyl group at the end
B: Methyl ladder polymer having hydroxyl group at the end
C: Phenyl ladder polymer having cage type end
D: 3,3'-diazidodiphenylsulfone,
E: 4,4'-diazidodiphenylsulfone
F: No separation,
G: Separation
H: No cracking,
I: Deterioration, color fading
J: Colored As described above, a surface protective film according to the present invention is obtained by forming a pattern on the color filter of a light-receiving element or a display element while using a resist as a mask, and thermosetting the color filter at a temperature as low as 270° C. Since the surface protective film is formed without impairing the characteristics of the color film as a substrate and it has an excellent light transmittance, it is possible to produce an element having excellent color receiving characteristics and color display characteristics. Such a surface protective film is composed of an organic solvent and a resin composition comprising: a polyalkylsylsesquioxane having a hydroxyl group at the end and containing a small amount of alkenyl groups at a side chain; and a trace amount of an aromatic bisazide compound.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A solution containing a low-temperature curing type organosilicon ladder resin composition comprising the following constituents (A) and (B):

(A) a low-temperature curing type organosilicon ladder polymer having a hydroxyl group at the end which is represented by the following general formula:

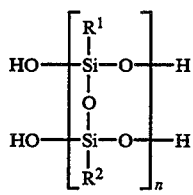

wherein $R^1$ and $R^2$ each represent phenyl group, methyl group or alkenyl group, provided that 2.5 to 104 of $R^1$ and $R^2$ are alkenyl groups, n representing an integer under the condition that the weight-average molecular weight of the organosilicon ladder is 75,000 to 250,000, (B) 0.25 and 2.5 wt % of an aromatic bisazide compound based on the low-temperature curing type organosilicon ladder polymer (A), wherein (A) and (B) are in admixture, the solution being used as the material of a surface protective film of a color filter for a light-receiving element or a display element.

2. A solution containing a low-temperature curing type organosilicon ladder resin composition according to claim 1, wherein the low-temperature curing type organosilicon ladder polymer (A) is polyphenylvinylsylsesquioxane.

3. A solution containing a low-temperature curing type organosilicon ladder resin composition according to claim 1, wherein the low-temperature curing type organosilicon ladder polymer (A) is polyallylphenylsylsesquioxane.

4. A solution containing a low-temperature curing type organosilicon ladder resin composition according to claim 1, wherein the low-temperature curing type organosilicon ladder polymer (A) is polymethylvinylsylsesquioxane.

5. A solution containing a low-temperature curing type organosilicon ladder resin composition according to claim 1, wherein the low-temperature curing type organosilicon ladder polymer (A) is polyallylmethylsylsesquioxane.

6. A solution containing a low-temperature curing type organosilicon ladder resin composition according to claim 1, wherein the low-temperature curing type organosilicon ladder polymer (A) is polyethylvinylsylsesquioxane.

7. A solution containing a low-temperature curing type organosilicon ladder resin composition according to claim 1, wherein the low-temperature curing type organosilicon ladder polymer (A) is polyallylethylsylsesquioxane.

8. A solution containing a low-temperature curing type organosilicon ladder resin composition according to claim 1, wherein the aromatic bisazide compound (B) is 3,3'-diazidodiphenylsulfone.

9. A solution containing a low-temperature curing type organosilicon ladder resin composition according to claim 1, wherein the aromatic bisazide compound (B) is 4,4'-diazidodiphenylsulfone.

10. A solution containing a low-temperature curing type organosilicon ladder resin composition according to claim 1, wherein the aromatic bisazide compound (B) is 2,6-di(azidobenzal)cyclohexanone.

11. A solution containing a low-temperature curing type organosilicon ladder resin composition according to claim 1, wherein the solvent of the solution is one selected from the group consisting of aromatic hydrocarbons such as anisole, xylene and benzene; ketone solvents such as methylisobutyl ketone and acetone; ether solvents such as tetrahydrofuran and isopropyl ether; ethyl cellosolve; N-methyl-2-pyrrolidone; N,N'-dimethylacetoamide; and a mixture thereof.

12. A solution containing a low-temperature curing type organosilicon ladder resin composition comprising the following constituents (A) and (B):
  (A) a polyphenylsylsesquioxane which has a hydroxyl group at the end, in which 3% of the side chain consists of vinyl groups, and which has a weight-average molecular weight of 150,000
  (B) 1.8 wt % of 3,3'-diazidophenylsulfone based on the polyphenylsylsesquioxane (A), wherein (A) and (B) are in admixture,
    the solution being used as the material for a surface protective film of a color filter for a light-receiving element or a display element.

13. A solution containing a low-temperature curing type organosilicon ladder resin composition comprising the following constituents (A), (B) and (C):
  (A) a polyphenylsylsesquioxane which has a hydroxyl group at the end, in which 3% of the side chain consists of vinyl groups, and which has a weight-average molecular weight of 150,000,
  (B) 1.8 wt % of 3,3'-diazidophenylsulfone based on the polyphenylsylsesquioxane (A),
  (C) methoxybenzene which is added to the polyphenylsylsesquioxane (A) so that the polyphenylsylsesquioxane content is about 15 wt %, wherein (A) and (B) are in admixture,
    the solution being used as the material for a surface protective film of a color filter for a light-receiving element or a display element.

* * * * *